Sept. 5, 1967 C. W. EARP 3,340,533

RADIO DIRECTION FINDING SYSTEM

Filed July 28, 1964 3 Sheets-Sheet 1

Inventor
CHARLES W. EARP
By [signature]
Attorney

Inventor
CHARLES W. EARP
By [signature]
Attorney

Inventor
CHARLES W. EARP
By [signature]
Attorney

United States Patent Office 3,340,533
Patented Sept. 5, 1967

3,340,533
RADIO DIRECTION FINDING SYSTEM

Charles William Earp, London, England, assignor to International Standard Electric Corporation, New York, N.Y., a corporation of Delaware Filed July 28, 1964, Ser. No. 385,668
Claims priority, application Great Britain, Aug. 19, 1963, 32,676/63
9 Claims. (Cl. 343—113)

This invention relates to systems for conveying information by means of electrical signals. More particularly the invention relates to a radio navigation system for conveying navigational information by means of a carrier wave in which the information is in terms of a difference in phase between the carrier wave and the resultant of a pair of sidebands of the carrier wave, said sidebands being developed at the receiver.

The invention may alternatively be considered as the transmission of a signal value in terms of the differential phase between the low-frequency beat between carrier and lower sideband, and the low-frequency beat between carrier and upper sideband.

When applied to certain navigational aids the transmission of a reference wave can be avoided. Frequently this means that not only is the basic transmission system simpler, but also that a single receiver can be used instead of two or three.

The invention also covers a demodulator arrangement which enables the information conveyed to be resolved.

According to the invention there is provided an electrical signal transmission system including means for transmitting a carrier wave the phase of which is representative of information transmitted by the system, and a receiver which includes a modulating signal source coupled to a modulator wherein a pair of sidebands of the received carrier wave are produced, and a demodulator circuit at the receiver wherein the said sidebands of the received carrier wave are demodulated by the received carrier wave.

Circuit arrangements embodying the present invention will now be described with reference to the accompanying drawings, in which.

Figure 1:
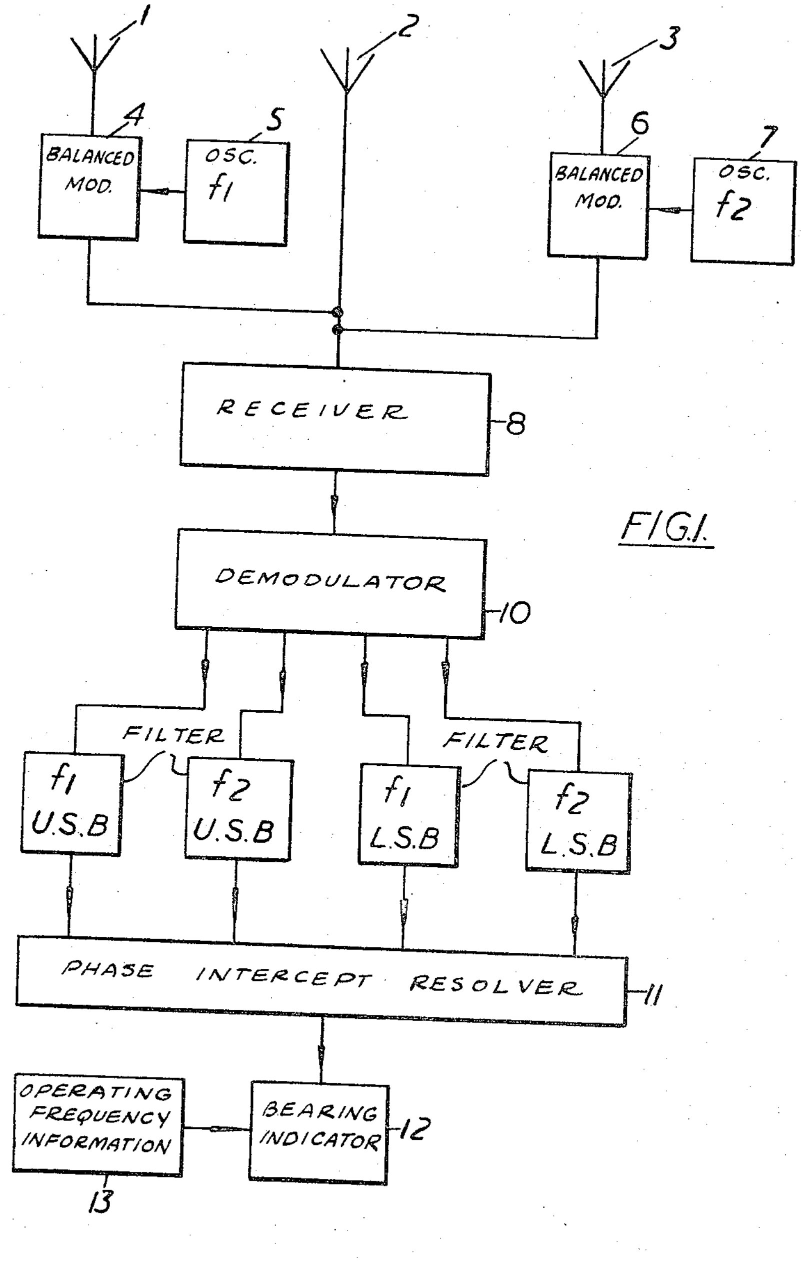
FIG. 1 shows a block schematic drawing of a receiver arrangement.
Figure 5:
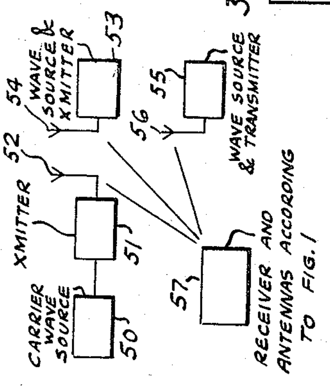
FIGURE 5 shows a block schematic of an information transmission system according to this invention.

The receiver of FIG. 1 is part of a direction finding system working on the interferometer principle. FIGURE 5 illustrates in block form, a typical embodiment of a system according to this invention which includes a first transmitting station comprising a carrier wave source 50 coupled to a transmitter 51 which is further coupled to a transmitting antenna 52. At a different location is a second transmitting station comprising a carrier wave source and transmitter 53 coupled to transmitting antenna 54. At a third location is carrier wave source and transmitter 55 which is coupled to transmitting antenna 56. These three transmitting stations transmit signals according to this invention to block 57 which represents a receiver and antenna arrangement according to FIG. 1.

The arrangement illustrated in FIG. 1 includes three aerial units 1, 2, 3 spaced out in line at right angles to the middle of the bearing sector required, with the middle aerial being displaced from the exact centre of the bearing sector by an amount of the order of ¼ of a wave length. The arrangement shown in FIG. 1 is designed to receive horizontally polarised waves and simple horizontal dipoles are used. For vertical polarised signals each aerial unit could consist of an Adcock pair of vertical dipoles having a figure of eight polar response, the null points being in line with the line of aerials.

Signals from the first aerial (at frequency F) are subjected to balanced modulation in modulator 4, at frequency $f_1$ (about 4000 c./s.) obtained from oscillator 5. Signals from the second aerial provide "carrier" at frequency F, and signals from the third aerial are modulated in balanced modulator 6 at frequency $f_2$ obtained from oscillator 7. All signals are now combined in a single receiver 8, which thus accepts the spectrum F, $F+f_1$, $F-f_1$, $F+f_2$, and $F-f_2$.

The receiver 8 is of a super-heterodyne type and a signal output at the intermediate-frequency is now introduced to a demodulator 10. For the sake of simplicity the intermediate frequency signal spectrum will be represented by the same symbols as used for the signals at the input to receiver 8, although of course, the intermediate frequency components occupy a lower frequency spectrum. The demodulator 10, which will be described later, gives four separate outputs, two at frequency $f_1$, and two at frequency $f_2$. These outputs correspond to the upper and lower sidebands at $f_1$, and the upper and lower sidebands at $f_2$; that is, they represent the four beats between the carrier at F, and the four sideband frequencies $F+f_1$, $F+f_2$, $F-f_1$, $F-f_2$ respectively.

The four low-frequency outputs, two at $f_1$, and two at $f_2$ are fed via filters $f_1$USB, $f_1$LSB, and $f_2$USB, $f_2$LSB to an unambiguous phase intercept resolver 11, which delivers the required information in the form of the angular position of the rotatable shaft of a bearing indicator 12.

The bearing indicator 12 is of a type in which the position of a motor shaft linearly represents the phase intercept. This type of bearing indicator is well known in the art and a more detailed discussion thereof is deemed unnecessary for a proper understanding of the instant invention. The apparatus in block 13 supplies the bearing indicator 12 with operating frequency information in order to obtain a correct bearing indication.

In the particular arrangement shown in FIG. 1 demodulator 10 provides independent demodulation of the four sidebands produced by the balanced modulation of the signals received at the aerials. In order to explain the operation of this demodulator with reference to FIG. 2 the explanation will be made for only one pair of sidebands although the principle of operation is exactly the same when more than one pair of sidebands is present.

Figure 2:
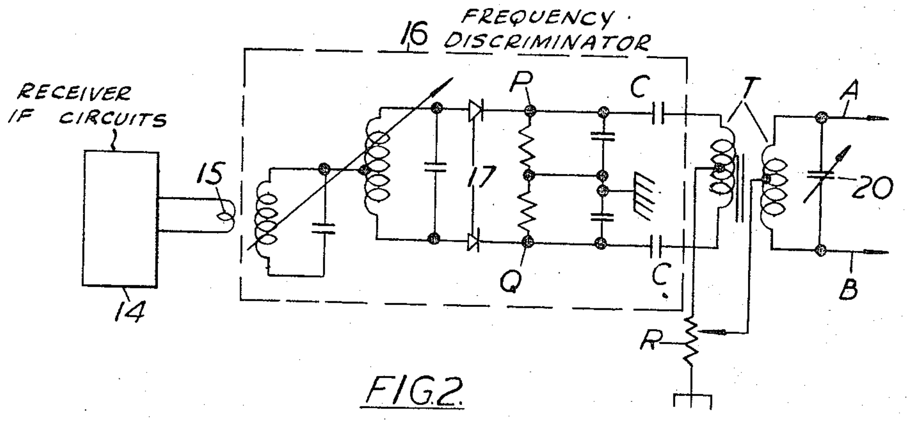
FIG. 2 shows a demodulator circuit.

Referring to FIG. 2 there is shown the block 14 representing the intermediate frequency circuits of the receiver 8 containing the received carrier F and the sidebands $F+f_1$ and $F-f_1$ produced by modulation. This signal spectrum from block 14 is introduced by a coupling coil 15 into a frequency discriminator 16 which includes a pair of diodes 17. The output from these diodes appears across balanced load resistors between points P and Q at frequency $f_1$. This output is then applied across the primary of a transformer T via D.C. blocking capacitors C. The center tap on the primary winding of transformer T is connected by a potentiometer R to earth. The adjustable tap at potentiometer R is connected to the center point of the secondary winding of transformer T. Outputs are obtained between point A, connected to one side of the secondary winding and ground, and point B, connected to the other side of the secondary winding and ground. The secondary winding is tuned by variable capacitor 20 to frequency F. In phase signals at points P and Q due to amplitude modulation are applied via the primary winding of transformer T and appear across resistor R. Anti-phase signals at points P and Q due to phase modulation are inductively coupled from the primary to the secondary winding of transformer T and produce outputs between point A and ground and point B and ground. In the absence of any D.C. connection between resistor R and the secondary winding of transformer T, the output across resistor R is in phase quadrature with the outputs between A and ground and B and ground. When the sum of the sidebands has a phase difference of 90° and 270° with respect to the carrier received by the aerial 2 then phase modulation is present on the signals obtained from block 14 and the signal outputs at points P and Q are in phase opposition. If the sum of the sideband vectors is in phase and 180° out of phase with the carrier received by aerial 2 the signals obtained from the block 14 are amplitude modulated and the outputs at points P and Q are in phase.

The signal present at block 14 is generally both phase modulated and amplitude modulated at frequency $f_1$ and these modulations are in phase. Hence the demodulated frequency modulation and amplitude modulation are in quadrature, since frequency modulation is the differential of phase modulation. As a result of the D.C. connection between the variable tap of potentiometer R and the secondary winding of transformer T it is possible to combine the A.M. and F.M. outputs in relative phases ±90 degrees to produce outputs at points A and B with respect to ground which are representative of the information contained in the upper and lower sidebands of the original signal. Exact balance may be achieved by adjusting the position of the variable tap on resistor R and tuning the transformer by means of variable capacitor 20 for exact quadrature phasing between F.M. and A.M. components.

Now, if the original signal is purely amplitude modulated, outputs at A and B will be in-phase. If the original signal is purely phase-modulated, outputs at A and B will the anti-phased. In general, phase difference between A and B is double the phase angle of displacement of F from the condition for pure amplitude modulation.

In some applications, the frequency F (of the carrier) is not known with sufficient precision to permit the necessary accuracy of tuning of the frequency discriminator of FIG. 2. This difficulty may be avoided by using the technique of FIG. 3, which incidentally permits the detection of small degrees of F.M. without the use of narrow bandwidth, yet with good signal/noise performance. In other words, the noise-threshold performance is much improved.

Figure 3A:
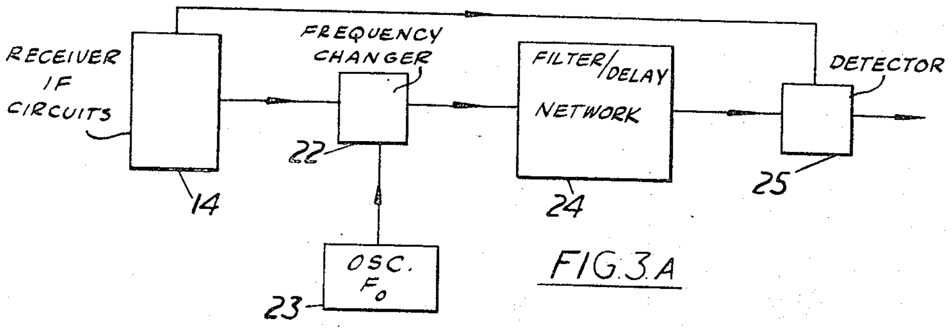
FIGS. 3A and 3B show respectively a block schematic and a circuit diagram of parts of a further demodulator.

In FIG. 3A the signal spectrum of carrier and sidebands is applied from block 14 to a frequency changer 22, the oscillator 23 of which is at a stable frequency $F_0$, which is usually much lower than F.

The beat frequency at $(F-F_0)$ is selected in a filter/delay network 24 which imposes a delay of approximately one quarter of the period of the modulating frequency $f_1$.

The delayed beat at frequency $(F-F_0)$ and the original signal are now combined in a final detector 25 from which an output beat signal at the stable frequency $F_0$, together with its sidebands are selected.

Now, the signal phase and amplitude envelopes (at frequency $f_1$) at the respective inputs to the final detector are in quadrature, timing being different by $\frac{1}{4}f_1$ sec. The original signal can be considered as having A.M. and phase-modulation components in-phase, say at 0 deg. with respect to an arbitrary reference. Therefore the signals at the inputs to the final detector have envelope phases of 0° and 90°.

The action of the final detector is to yield amplitude modulation at 45°, but phase modulation at −45°, for A.M. envelopes are effectively added, but on the beat selected, phase-modulations are subtracted.

Output from the detector 25 is comprised of a carrier wave at the stable and comparatively low frequency $F_0$ which bears both phase and amplitude modulation at frequency $f_1$, the two modulations being in quadrature.

It is now necessary to extract phase-modulation and A.M. components, and to combine them to yield outputs representative of one or both sidebands. This is achieved in a circuit generally similar to that of FIG. 2, but modified in detail, because in FIG. 2 the amplitude-modulations and phase-modulations were in-phase, but in the new signal at $F_0$ the modulations are in quadrature.

Figure 3B:
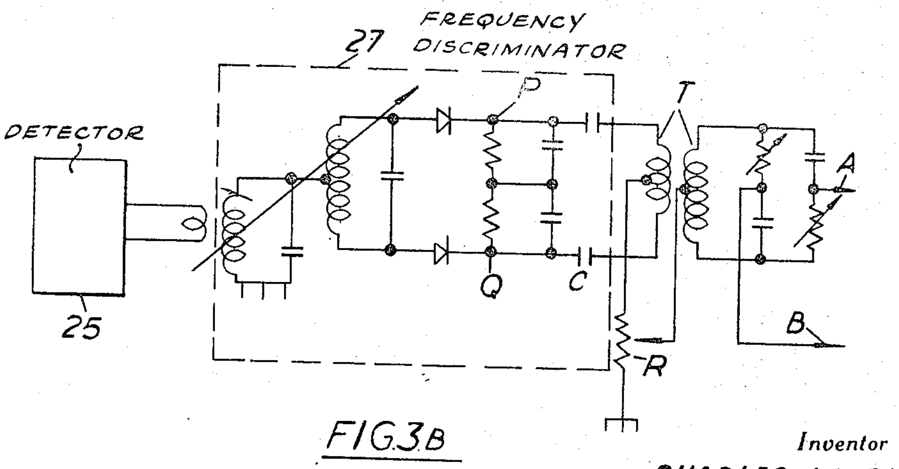

In FIG. 3B the modulated signal $F_0$ obtained from detector 25 is applied to a normal frequency discriminator 27 as in FIG. 2, and outputs from P and Q contain components due to signal amplitude-modulation and phase-modulation, as before. In the present case the signal at $F_1$ has amplitude-modulation and phase-modulation components in quadrature and therefore A.M. and F.M. in-phase.

"Push-pull" output from P and Q is representative of F.M. and this is applied to transformer T. "Parallel" output from P and Q representing the original A.M. component is applied to potentiometer R.

The secondary winding of transformer T is provided with two adjustable phase-shifting networks which advance or retard the phase of the "push-pull" components by 90°, but which do not affect the phase of the signal from potentiometer R.

Hence, "parallel" and "push-pull" components at frequency $f$ are combined in relative phases +90° and −90°, to give upper and lower demodulated sidebands at A and B.

It is an important feature of the circuit of FIG. 2, and that of the circuit of FIG. 3B, that the two outputs are exactly representative of the beats between carrier and upper sideband, and carrier and lower sideband, whether or not the carrier is at a higher or lower power level than sidebands. The circuits represent a practical method of separating upper and lower sidebands without the use of selective filters which could introduce phase distortions.

In this embodiment of the invention there is a further pair of sidebands produced by the balanced modulation of the carrier by $f_2$. The demodulator outputs at $f_2$ can be obtained by duplicating the frequency discriminator 16 and the arrangement comprising the tuned transformer T and the potentiometer R, the tuning of the transformer T and the adjustment of the potentiometer R in the duplicate arrangement being such as to obtain exact balance and quadrature phasing between the F.M. and A.M. components at the output frequency $f_2$. Alternatively each of the blocking capacitors C may be coupled to the inputs of a pair of cathode-follower or buffer amplifier stages instead of being directly coupled to the terminals of the primary winding of the transformer T, which are coupled respectively to the output of one of the cathode followers or buffer amplifiers in each of the pairs. In a duplicate arrangement comprising the transformer T and potentiometer R, the terminals of the primary winding of the transformer are coupled respectively to the output of the other cathode follower or buffer amplifier in each of the pairs.

The delay imposed by the filter delay network 24 will not of course be exactly equal to one quarter of the period of both $f_1$ and $f_2$. It is not, however, necessary for the delay to be exactly one quarter of the period of the modulating frequency and moreover the difference between $f_1$ and $f_2$ can usually be made small.

Figure 4:
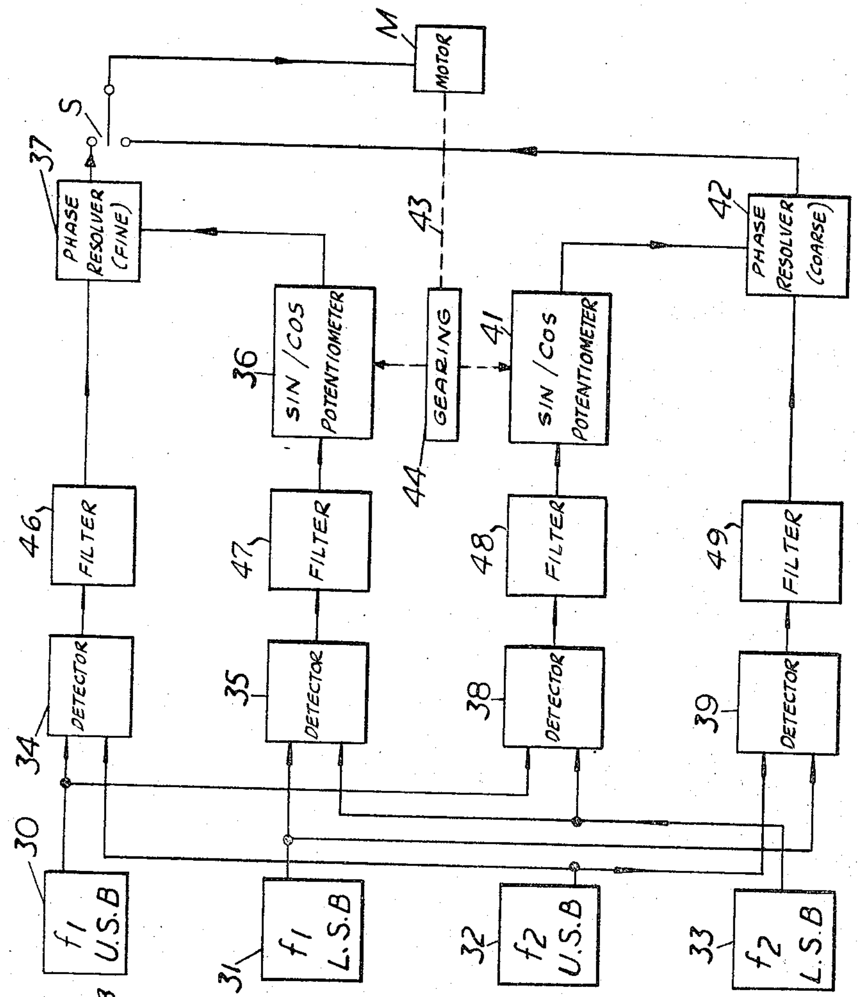
FIG. 4 shows a block schematic of a resolver used in the receiver arrangement.

The phase intercept resolver 11 is illustrated in FIG. 4 where blocks 30, 31, 32 and 33 contain respectively the incoming signals representing the upper sidebands produced by balanced modulation of the carrier by $f_1$, the lower sideband of $f_1$ produced by balanced modulation of the carrier by $f_1$, the upper sideband produced by balanced modulation of the carrier by $f_2$, and the lower sideband produced by balanced modulation of the carrier by $f_2$.

The upper sideband at frequency $f_1$ is detected with the upper sideband at $f_2$, in detector 34, giving a beat at $(f_1-f_2)$ which rotates in phase rapidly with the bearing in azimuth of the received signal. Over the bearing arc of 180 between in-line aerial directions, phase actually rotates through a range of $4\pi d/\lambda$ radians, where $d$ is the distance between the outer aerials.

The lower sideband at $f_1$ is detected with the lower sideband at $f_2$ in the detector 35 to give a beat at $(f_1-f_2)$ which rotates in the opposite direction over the range $4\pi d/\lambda$ radians.

The beat from detector 34 is fed to phase resolver 37 via filter 46 which is tuned to $(f_1-f_2)$. The other beat from detector 35 is fed to phase resolver 37 via a rotatable sin/cos potentiometer 36 and via filter 47 which is also tuned to $(f_1-f_2)$. In this embodiment of the invention, phase resolver 37 is a "sum-and-difference" detector. Unbalance of the phase resolver starts motor M which establishes a predetermined phase balance through the motor shaft 43 and gearing 44.

The motor-shaft angular position is now indicative of signal phase intercept, but there are, of course, a number of ambiguous positions which can be resolved as follows:

$f_1$ (upper sideband) is detected in detector 38 with $f_2$ (lower sideband) to give a beat at $(f_1-f_2)$ which rotates in phase very slowly with azimuth of signal, for the phase of the signal inputs at $f_1$ and $f_2$ rotates by slightly differing amounts in the same direction.

$f_1$ (lower sideband) is detected in detector 39 with $f_2$ (upper sideband) to give a beat at $(f_1-f_2)$ which rotates in phase slowly in the opposite sense from the other slowly-rotating beat.

The beat from detector 38 is fed to phase resolver 42 via filter 48 which is tuned to $(f_1-f_2)$ and via a second rotatable sin/cos potentiometer 41, controlled by the motor shaft 43 through gearing 44. The other beat from detector 39 is fed to phase resolver 42 via filter 49 which is also tuned $(f_1-f_2)$. The resolver 42 operates the motor M until a pre-determined phase balance is established, when the angular position of the motor shaft 43, mechanically coupled to the bearing indicator 12, is unambiguously representative of signal azimuth.

Interlock arrangements are made such that switch S normally connects the motor to the "coarse" resolver. Only under the condition that a signal is present, and also that the "coarse" resolver 42 is balanced does switch S connect the "fine" resolver 37.

The two sin/cos potentiometers must, of course, be suitably phased, and have a correct relative gear ratio, but with such adjustment the motor shaft will take up a position accurately representative of the required phase intercept.

The demodulator arrangements shown in FIGS. 2 and 3 may be used to detect signals received in a commutated aerial direction finder system (C.A.D.F.).

In a known C.A.D.F. (commutated aerial direction finding) system, signals are derived from a fixed aerial, and also from a ring of aerials which are commutated in turn to a common output. The two sources of signal normally feed two separate receivers.

In a further example of the application of the present invention, either the single aerial output, or the commutated signal is subjected to balanced modulation at about 4000 c./s., and then the unmodulated signal is combined with the modulated signal in a single receiver incorporating the demodulator. Thus, one signal train comprises a carrier wave for the 4 kc./s. sidebands of the other, but owing to the fact that the commutated train is derived from aerials in different positions, the "carrier" train is continuously changing in phase with respect to the sidebands.

Selection of the beat between carrier and either of the two sidebands would yield a phase-modulated wave of mean frequency 4000 c./s., which may easily be frequency-modulated to yield the required bearing information.

After amplification and selection of the total signal, the signal is available at a nominal I.F. frequency of, say, 2 mc./sec. However, exact frequency is not known, as receiver tuning will rarely be perfect.

The total I.F. signal may therefore be introduced to the circuit of FIG. 3 where F is nominally 2 mc./sec., and $f$, is 4000 c./s. $F_0$ is an accurately defined frequency of, say, 100 kc./sec. The output from the detector 25 is at 100 kc./sec., which is amplitude and phase-modulated by varying degrees according to the connection of the aerial commutator to different aerials.

The delay network 24 imposes a delay of $\frac{1}{4}\times\frac{1}{4000}$ second.$=\frac{1}{16}$ millisec.

The output train at 100 kc./sec. is now introduced to the discriminator 27 where the frequency discriminator is centered on 100 kc./sec., and where the low-frequency phasing is arranged to select either the upper sideband or lower sideband or both, at 4000 c./s., depending upon whether the output is taken between A, or B, and ground, or from a combination of the two.

Each of these output waves at 4000 c./s. is subject to cyclic phase modulation at the frequency of the aerial commutator, usually at about 50 c./s., and either train may be subjected to frequency de-modulation to yield a sinusoidal 50 c./s. the phase of which is representative of the signal bearing.

The method is equally applicable to the true Doppler type of D.F. where one, or perhaps both, of two aerials are physically gyrated.

While I have described above the principles of my invention in connection with specific apparatus, it is to be clearly understood that this description is made only by way of example and not as a limitation to the scope of my invention as set forth in the accompanying claims.

What I claim is:

1. A radio navigation system comprising:
   a transmitting terminal having:
      a carrier wave source; and
      means for transmitting said carrier wave; and
   a receiving terminal, said receiving terminal including:
      means to receive said carrier wave;
      a modulating signal source;
      an amplitude modulator coupled to said modulating signal source and to said receiving means for amplitude modulating said received carrier wave to produce a pair of sidebands of said received carrier wave; and
      a demodulator responsive to frequency modulation and amplitude modulation coupled to said modulator, said demodulator having means for beating said pair of sidebands of said amplitude modulated carrier wave with said received carrier wave to produce a first signal representative of the phase difference between said received carrier wave and the resultant of said pair of sidebands of said carrier wave.

2. A radio navigation system according to claim 1 wherein said receiving terminal comprises:
   at least first and second spaced receiving aerials;
   means coupling said amplitude modulator to one of said aerials for amplitude modulating carrier wave received by said one aerial to produce a pair of sidebands of said received carrier wave.

3. A radio navigation system according to claim 1 wherein said demodulator includes:
   means for generating a second signal by frequency demodulating said first signal;
   means for generating a third signal by amplitude demodulating said first signal; and
   circuit means for combining said second signal in phase quadrature with said third signal.

4. A radio navigation system according to claim 3 wherein said demodulator further includes:
   means for generating a fourth signal anti-phased with respect to said second signal by frequency demodulating said first signal;

means for combining said third signal in phase quadrature with said fourth signal; and means coupled to said combining means for feeding the resultant of said quadrature combinations of the third signal with said second and fourth signals, respectively, to the outputs, of said demodulator.

5. A radio navigation system according to claim 3 wherein said demodulator includes:

a transformer having a tapped primary winding and a center tapped secondary winding;

a potentiometer having a slider thereon coupled between the tap on said primary winding and ground potential;

means coupling the slider of said potentiometer to the center tap of said secondary winding;

means coupled to said secondary winding for tuning said secondary winding to the frequency of the modulating signal source; and a pair of unidirectional conductance devices, each being coupled to a respective end of said primary winding.

6. A radio navigation system according to claim 3 wherein said demodulator includes:

means for mixing a portion of said received carrier wave and the sidebands thereof with a lower frequency signal to convert said portion of said carrier wave and sidebands thereof to a different frequency spectrum;

means coupled to said mixer for delaying in time said portion by a period equal to one-quarter of the period of the modulating signal or by an odd multiple of said one-quarter period; and means including an amplitude detector for combining said delayed portion with said received carrier wave and said sidebands thereof.

7. A radio navigation system according to claim 1 wherein said receiving means includes at least first, second and third spaced aerials, and wherein said receiving terminal further comprises:

means coupling said first modulator to a first one of said aerials;

at least a second modulating signal source having a different frequency than said first modulating signal source;

at least a second amplitude modulator coupled to said second modulating signal source and to a second one of said aerials to produce a pair of sidebands of the signal received by said second aerial; and means for feeding said pairs of sidebands from the outputs of each of said modulators and the carrier wave received by the third one of said aerial to the input of said demodulator wherein said sidebands are demodulated by said carrier wave.

8. A radio navigation system according to claim 7 further including:

a plurality of detectors coupled to said demodulator for beating signals of the upper and lower sidebands produced by the first one of said modulators with signals representative of the corresponding sidebands produced by the second one of said two modulators; and a phase resolver coupled to said detectors for phase comparing the outputs of predetermined ones of said detectors to produce an output indicative of the received signal phase intercept.

9. A radio navigation system according to claim 8 further comprising detector means coupled to said demodulator for beating the signals representing the upper and lower sidebands produced by one of said modulators with signals representative of the opposite sidebands produced by the other of said modulators for reducing ambiguity in the signal phase intercept indication.

References Cited

UNITED STATES PATENTS 3,111,667 11/1963 Stavis -------------- 343—14

RODNEY D. BENNETT, *Primary Examiner.*

CHESTER L. JUSTUS, *Examiner.*

D. C. KAUFMAN, *Assistant Examiner.*